United States Patent [19]
Parker et al.

[11] Patent Number: 5,941,531
[45] Date of Patent: Aug. 24, 1999

[54] DOUBLE GAS SEAL HAVING AN IMPROVED BELLOWS ARRANGEMENT

[75] Inventors: Joseph C. Parker, Otsego; Christopher D. McCowey, Portage; William V. Adams, Scotts, all of Mich.

[73] Assignee: Durametallic Corporation, Kalamazoo, Mich.

[21] Appl. No.: 08/810,295

[22] Filed: Mar. 3, 1997

[51] Int. Cl.⁶ .................................................. F16J 15/34
[52] U.S. Cl. ........................ 277/369; 277/361; 277/387
[58] Field of Search .................................. 277/361, 369, 277/384, 387, 390, 408, 392; 29/454, 888.3

[56] References Cited

U.S. PATENT DOCUMENTS

| | | | |
|---|---|---|---|
| 2,420,556 | 5/1947 | Mueller | 277/363 X |
| 3,079,605 | 2/1963 | Thomas et al. | 277/369 |
| 3,333,856 | 8/1967 | Voitik | 277/363 X |
| 3,372,076 | 3/1968 | Wilkinson | 277/393 X |
| 3,475,033 | 10/1969 | Voitik | 277/387 |
| 3,575,424 | 4/1971 | Taschenberg | 277/411 |
| 3,805,882 | 4/1974 | Vallance | 277/360 X |
| 3,880,434 | 4/1975 | Echard et al. | 277/361 X |
| 3,988,026 | 10/1976 | Kemp, Jr. | 277/369 |
| 4,013,297 | 3/1977 | Smith | 277/365 |
| 4,071,253 | 1/1978 | Heinen et al. | 277/369 |
| 4,123,069 | 10/1978 | Sato | 277/391 |
| 4,136,887 | 1/1979 | Wentworth, Jr. | 277/374 |
| 4,183,541 | 1/1980 | Wentworth, Jr. | 277/379 |
| 4,365,816 | 12/1982 | Johnson et al. | 277/392 |
| 4,721,311 | 1/1988 | Kakabaker | 277/369 |
| 4,749,200 | 6/1988 | Sehnal et al. | 277/392 |
| 5,149,249 | 9/1992 | Schellong et al. | 277/369 |
| 5,490,679 | 2/1996 | Borrino et al. | 277/369 |
| 5,544,897 | 8/1996 | Di Pietro et al. | 277/389 |

FOREIGN PATENT DOCUMENTS 1586226 2/1970 France ...................................... 29/454

OTHER PUBLICATIONS

A New Shaft Sealing Solution for Small Cryogenic Pumps, C.P. Morrissey, John Crane EAA, Feb. 5, 1996 (5 pages).
EG&G Sealol Industrial Division, "Non–Contacting Welded Metal Bellows Seal for Process Equipment" Type 1010 brochure, Dec. 1996, (6 pages).
Enlargement of Type 1010 gas seal, from p. 5 of EG&G Sealol Industrial Division, "Non–Contacting Welded Metal Bellows Seal for Process Equipment" Type 1010 brochure, Dec. 1996.

*Primary Examiner*—Anthony Knight
*Assistant Examiner*—Greg Binda
*Attorney, Agent, or Firm*—Flynn, Thiel, Boutell & Tanis, P.C.

[57] ABSTRACT

An improved gas seal having inboard and outboard seal units each defined by a pair of opposed and relatively rotatable seal faces, one face of each pair having appropriate grooves which communicate with a pressurized barrier gas, preferably an inert gas such as nitrogen. The inboard seal unit, at its other seal periphery, communicates with a process fluid being handled by a rotating equipment, namely a pump. Each seal unit has one of the seal rings, the nonrotating ring in the preferred embodiment, urged axially toward its opposed ring by a compact bellows which axially cooperates between the respective seal ring and a backing member. The bellows is positioned to create an isolation between the barrier and process fluids and to provide an effective diameter to provide desirable balance of pressures as imposed on the axially moving seal ring to optimize seal performance. The bellows is preferably a single convolution which is free of fixed securement to the moving seal ring.

31 Claims, 8 Drawing Sheets

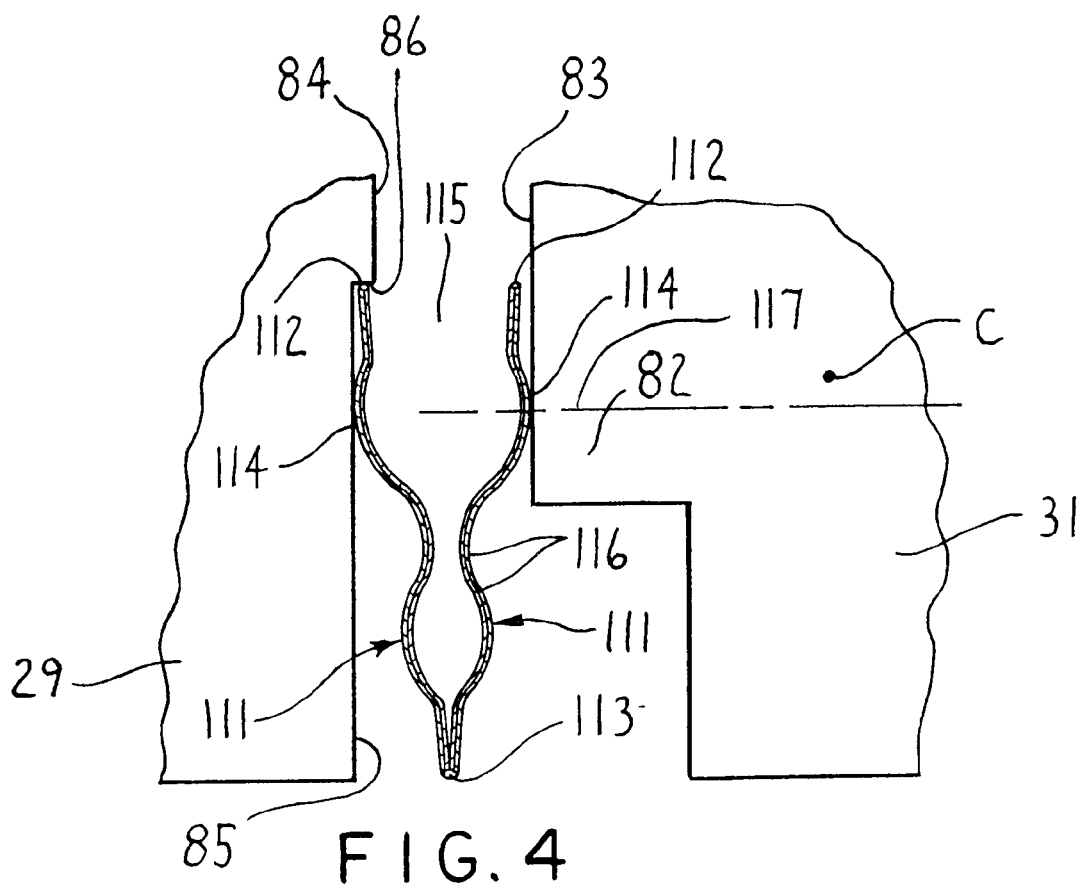

5,941,531

DOUBLE GAS SEAL HAVING AN IMPROVED BELLOWS ARRANGEMENT

FIELD OF THE INVENTION

This invention relates to an improved face-type double seal for creating a sealed relationship between a housing and a rotatable shaft and, more particularly, to a double gas seal which can be constructed as a small compact arrangement so as to be particularly desirable for use on pumps, particularly pumps of the type having a small stuffing box or chamber.

BACKGROUND OF THE INVENTION

Numerous variations of opposed face-type seals, often referred to as mechanical seals, have been developed for use in creating a sealed relationship between a rotatable shaft and a surrounding housing. Such seals, including those of the type which are often referred to as gas seals, are conventionally positioned within a stuffing box or seal chamber which is defined within the housing in surrounding relationship to the shaft. In many types of equipment requiring use of such seals, however, and particularly pumps, the stuffing box or seal chamber is of an extremely small size (that is, the stuffing box is of a small radial clearance as measured between the inner diameter of the surrounding housing and the outer diameter of the rotatable shaft). For example, large numbers of pumps often referred to as ANSI pumps provide only about 5/16 to 3/4 inch radial bore clearance for accommodating the seal or packing, and positioning an effective opposed face-type seal in such small space has generally been extremely difficult, and hence other types of sealing or packing arrangements have often been utilized on pumps having small packing or stuffing box chambers (such pumps often being referred to as having small bore seal chambers). The problem is further complicated by the fact that such pumps, adjacent the end of the stuffing box, also generally provide little available space for mounting a seal exteriorly of the stuffing box.

While numerous mechanical seals of the opposed face type have been developed and utilized on fluid handling equipment including pumps, nevertheless most such seals have been undesirably large, both radially and axially, and hence have not been suitable for adaptation to and use on small bore pumps. For example, numerous double mechanical seals have been developed, including not only contacting face-type, but also gas seals which include both contacting and non-contacting face types. These known seals, however, in addition to exhibiting the conventional largeness which restricts their application to small-bore pumps, have also conventionally possessed the recognized problems of secondary seal hang-up and incompatibility of O-rings with the pumped fluid. In an effort to eliminate or minimize these latter problems, many of the known mechanical seals of both the gas and non-gas types have employed metal bellows to eliminate the O-rings as secondary seals and thus attempt to minimize the secondary seal hang-up and seal ring compatibility problems. The seals employing metal bellows, however, have generally employed rather large complex bellows arrangements which have typically employed multiple bellows convolutions provided with retaining flanges or elements at opposite ends, which retaining flanges in turn are either pressed, fitted or otherwise fixedly secured to the adjacent members of the seal assembly. These bellows have hence significantly increased the structural and manufacturing complexity of the seal assembly, and have resulted in the seal assembly being of significant size, particularly with respect to axial length. Such seal bellows also make it difficult to achieve a predictable and maintainable balance diameter when the bellows is subjected to the pressures of the pump process fluid on one side and a barrier fluid on the other side, and hence this inability to maintain an accurate balance diameter can cause variations in the balance pressure and accordingly can effect the amount of fluid which escapes or passes between the opposed seal faces, particularly in a non-contacting-type gas seal.

The use of conventional bellows in known seals, as discussed above, further complicates the proper application of forces to the seal rings, particularly with respect to the application of these forces relative to the centroids of the seal rings, and thus maintaining proper convergence and hence proper opposed contacting or adjacent relationship between the opposed seal faces is further complicated. The fact that many of the known bellows also have a collar at one end which typically has a shrink fit onto the seal ring also induces additional stresses into the seal ring which can interfere with proper seal ring configuration and hence can affect the proper convergence of the seal faces.

Accordingly, it is an object of this invention to provide an improved face-type double seal, particularly a gas seal, having a desirably small and compact configuration so as to be particularly adaptable for use on pumps having small bore seal chambers, which improved seal is believed to overcome many of the disadvantages associated with conventional known seals, as briefly summarized above.

More specifically, this invention relates to an improved gas seal having inboard and outboard seal units each defined by a pair of opposed and relatively rotatable seal faces, one face of each pair having appropriate grooves which communicate on one seal periphery with a pressurized barrier gas, preferably an inert gas such as nitrogen. The inboard seal unit, at its other seal periphery, communicates with the process fluid being handled by the rotating equipment, namely the pump. Each seal unit has one of the seal rings, the nonrotating ring in the preferred embodiment, urged axially toward its opposed ring by a compact bellows which axially cooperates between the respective seal ring and a backing member. The bellows is positioned to create an isolation between the barrier and process fluids and to provide a mean effective diameter to provide desirable balance of pressures as imposed on the axially moving seal ring to optimize seal performance.

In the improved seal of this invention, as aforesaid, the bellows is preferably of a single convolution defined primarily by two bellows plates or leaflets which are sealingly engaged along one radial edge, the inner radial edge in the preferred embodiment, and have their other radial edges (the outer radial edges in the preferred embodiment) respectively sealingly engaged against the axially movable seal ring and the backing member. The bellows is preferably free of retaining collars and the like so as to simplify the bellows construction and size, and one of the bellows plates is preferably maintained in a nonfixed but contacting sealing engagement with an opposed face formed on the adjacent seal ring. This greatly simplifies the overall compactness as well as manufacture and assembly of the seal, and minimizes the application of fixation forces on the seal ring which tend to create undesirable distortion thereof. The nonfixed seal contact point or points with the bellows are preferably provided with a gasket-type material associated therewith, such as by coating the exterior surface of the bellows with a suitable gasket-like material, or by providing a gasket between the bellows and the opposed contact surface, which gasket can be either fixed to and captivated on the bellows or mounted on the opposed contact surface.

The improved seal of this invention, due to the structure and functional cooperations created by the bellows, minimizes or eliminates the secondary seal drag problem created when the secondary seal is defined by conventional O-rings, the bellows is still able to accurately maintain a proper pressure balance diameter without experiencing the significant variations which have been experienced with conventional elongate multiple convolution bellows as used in prior seals, the bellows enables the seal to operate with higher temperature process fluids without encountering problems of seal degradation or incompatibility with the process fluid, the bellows can be constructed free of end collars or the like and hence can be engaged with the adjacent seal ring and backing member solely through a sealed pressure contact to simplify the construction and minimize undesired distortion forces, particularly on the seal ring. The overall seal can be manufactured in a very small and compact size so as to be particularly adaptable for mounting exteriorly of but directly adjacent the stuffing box of a pump, with the overall seal being effectively constructed preferably as a cartridge to facilitate its adaptation to the shaft of the pump.

The improved seal, as aforesaid, also includes a balance piston or pusher associated with the inboard seal unit so that, upon failure of the barrier pressure, the process fluid pressure will effectively shift the pressure piston to effect a sealed closure with the respective seal ring, preferably on the barrier fluid side of the bellows, to prevent escape of process fluid.

The improved seal, as aforesaid, also prevents the application of significant unbalanced process fluid pressures on the seal rotor.

Other objects and purposes of the invention will be apparent to persons familiar with structures of this general type upon reading the following specification and inspecting the accompanying drawings.

BRIEF DESCRIPTION OF THE DRAWINGS

FIG. 4 is an enlarged cross-sectional view of a single-convolution bellows as utilized in the seal of this invention.

Figure 1:
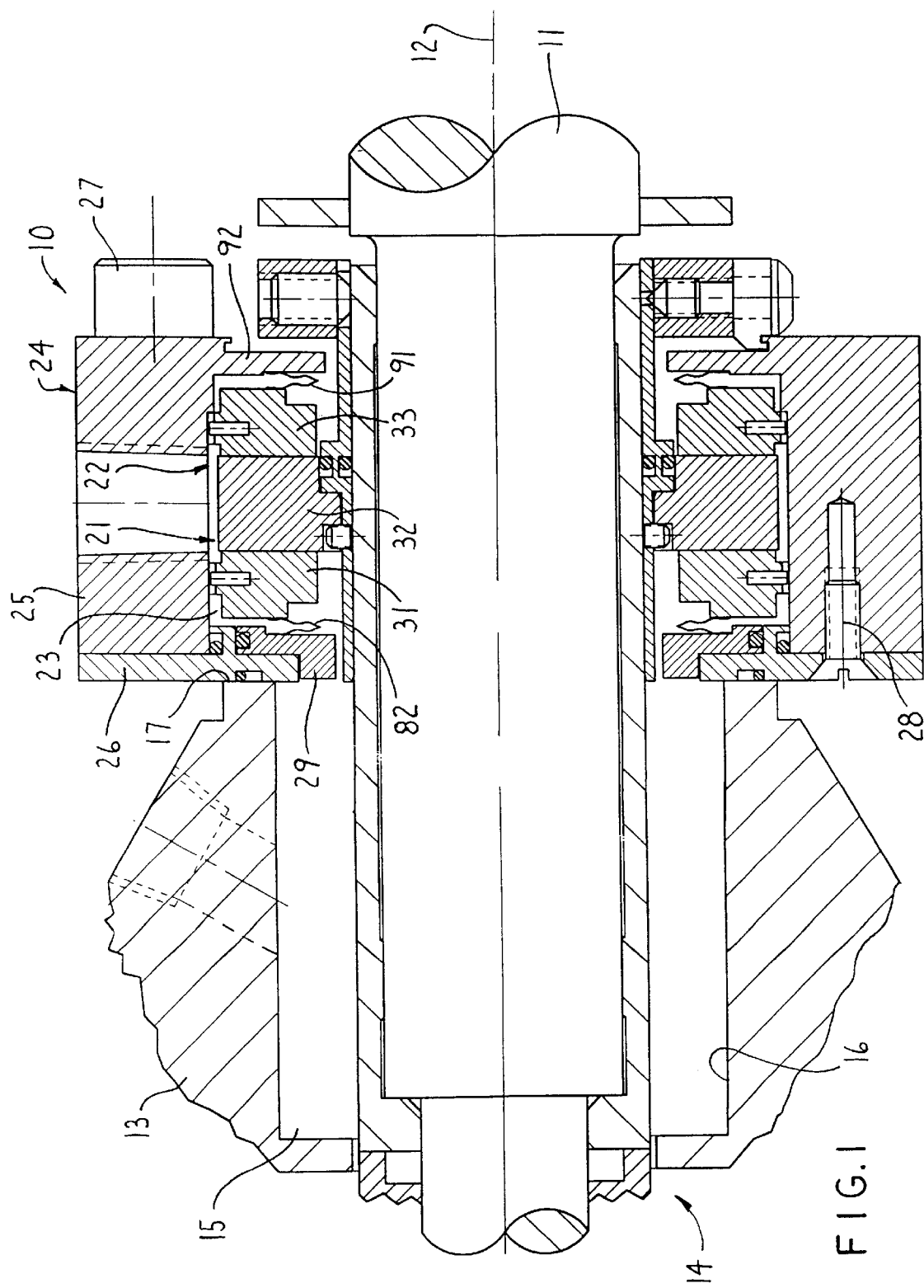
FIG. 1 is a central cross-sectional view taken axially through the stuffing box of a small bore pump and showing the improved double seal of this invention.

Certain terminology will be used in the following description for convenience in reference only, and will not be limiting. For example, the words "upwardly", "downwardly", "rightwardly" and "leftwardly" will refer to directions in the drawings to which reference is made. The words "inward" and "outward", when used in conjunction with the pump, will refer to directions which are respectively inwardly of the stuffing box toward the pumping chamber and outwardly away therefrom. The words "inwardly" and "outwardly" will also refer to directions toward and away from, respectively, the geometric center of the overall seal assembly and designated parts thereof. Said terminology will include the words specifically mentioned, derivatives thereof, and words of similar import.

DETAILED DESCRIPTION

Figure 2:
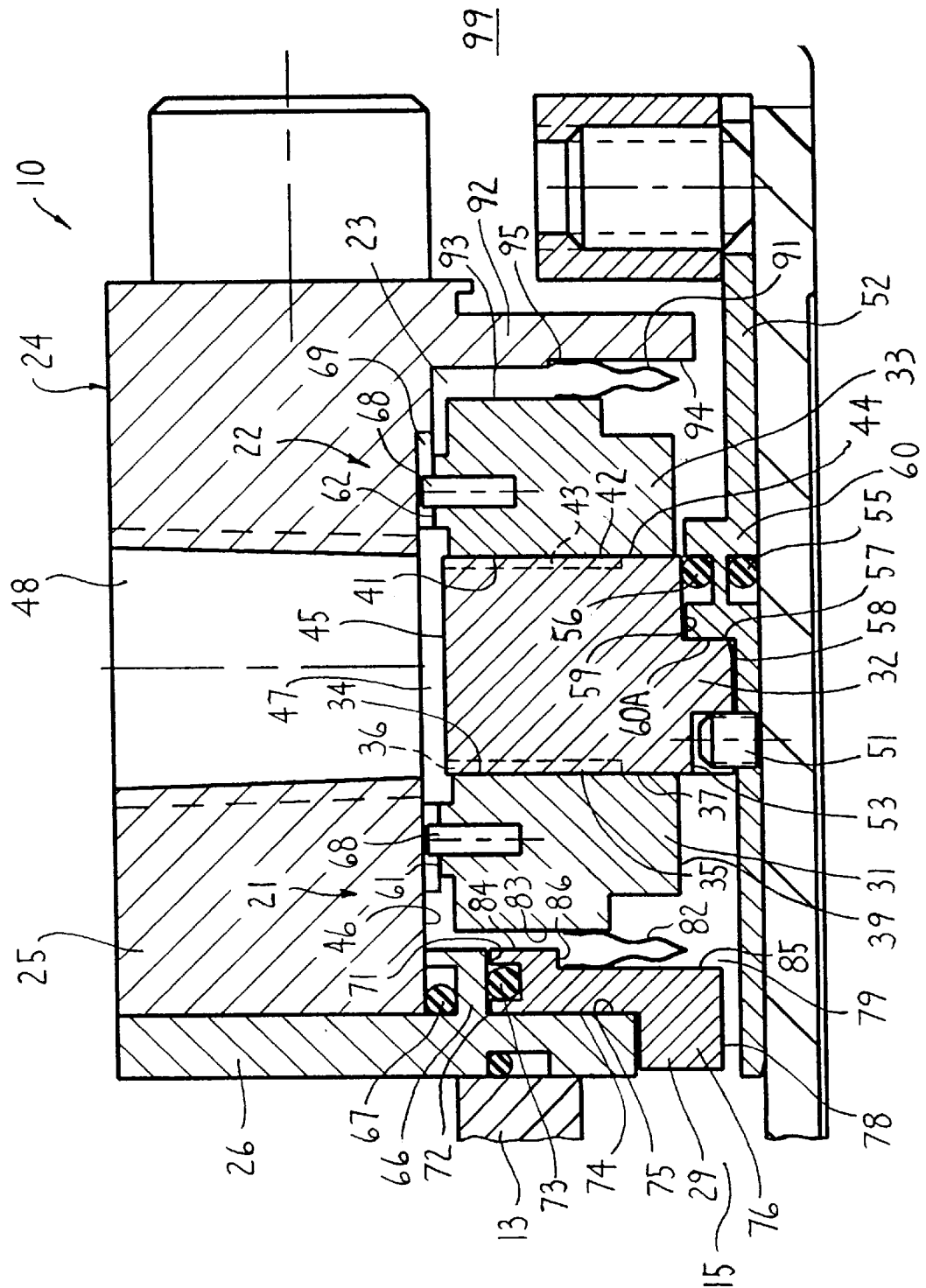
FIG. 2 is an enlarged sectional view of the upper half of the seal shown in FIG. 1, the seal being shown in its normal operating position.

Referring to the drawings, and specifically FIGS. 1 and 2, there is illustrated a double seal arrangement 10 according to the present invention. This seal arrangement is disposed in surrounding relationship to a shaft 11 which rotates about its axis 12, and which is rotatably supported on and projects outwardly from a housing 13 associated with a fluid handling device such as a pump 14. In the illustrated embodiment, the shaft 11 includes a surrounding shaft sleeve fixed thereto. The housing 13 has a sleeve portion which defines therein an annular stuffing box or chamber 15 as disposed in surrounding relationship to the shaft 11. This stuffing box 15, in the illustrated embodiment, is for a small seal chamber pump, and the stuffing box is defined within an outer annular wall 16 defined by the pump housing. The improved double seal arrangement 10 of this invention is disposed so as to substantially abut an outer end 17 of the stuffing box housing so as to permit a sealing closure of the outer end of the stuffing box 15.

The double seal arrangement 10 includes axially inboard and outboard seal units 21 and 22, respectively, which are positioned within an annular chamber 23 which is defined generally by a gland structure 24 which is fixed to the pump housing 15 in surrounding relationship to the shaft 11. This gland structure 24 includes a main gland plate 25 which axially abuts an inner gland plate 26, the latter being sealing engaged to an end face of the stuffing box housing. Suitable fasteners or screws 27 and 28 are provided for fixedly joining the gland plates 25 and 26 together, and for effecting securement thereof to the pump housing.

The inboard seal unit 21 includes a first annular seal ring (herein also referred to as the "first stator") 31 which rotatably surrounds the shaft 11 and cooperates with an axially adjacent second seal ring (herein also referred to as the "rotor") 32. The first seal ring 31 is nonrotatably secured relative to the surrounding gland plate, and the second seal ring 32 is rotatable due to its nonrotatable securement relative to the shaft. The outboard seal unit 22 is of similar construction in that it includes a third seal ring (herein also referred to as the "second stator") 33 which is nonrotatably secured relative to the gland structure and is disposed axially outwardly of the second seal ring 32. The third seal ring 33 cooperates with the second seal ring 32 to define the outboard seal unit.

More specifically, the inboard seal unit 21 includes flat and substantially planar ringlike seal faces 34 and 35 which are respectively defined on the seal rings 31 and 32 and are disposed on directly adjacent and axially opposed end faces thereof which extend in substantially perpendicular relation to the axis 12. At least one of these seal faces 34 and 35 is provided with a plurality of shallow grooves 36 formed therein, these grooves being formed in the seal face 35 of the rotating seal ring 32 in the illustrated embodiment. The grooves 36 in the illustrated embodiment project radially inwardly from the outer diameter of the interface between the seal faces 34, 35, with the inner ends of the grooves terminating in radially spaced relationship from the radially inner diameter of the seal face interface so as to define an annular nongrooved dam region 37 adjacent the radially inner end of the interface between the opposed seal faces 34 and 35. The grooves 36 are disposed in circumferentially spaced relation around the respective seal face, and typically are angled circumferentially as they project radially inwardly, commonly being referred to as spiral or angled grooves.

The outboard seal unit 22 is similarly constructed in that it includes annular ringlike seal faces 41 and 42 which are respectively defined on the seal rings 33 and 32 and are disposed on closely adjacent and directly opposed axial end surfaces thereof. One of the faces 41 and 42, the face 42 in the illustrated embodiment, is provided with shallow grooves 43 which are formed in the seal face in circumferentially spaced relation therearound, with these grooves 43 conventionally angling circumferentially as they project radially inwardly from the outer diameter of the interface between the seal faces 41 and 42. The grooves 43 are also separated from the inner diameter of this seal interface by a nongrooved annular dam 44.

The specific configuration of the seal faces 34–35 and 41–42, and of the grooves and dams associated therewith, is conventional and one example of a known seal face configuration is illustrated by U.S. Pat. No. 5,556,111, as owned by the Assignee hereof.

The second seal ring 32 defines thereon an outer annular wall 45 which is of smaller diameter than and is spaced radially inwardly from the stepped inner annular wall 46 of the main gland plate 25, thereby defining an annular chamber 47 therebetween to which is supplied a pressured barrier or barrier fluid, normally a pressurized inert gas such as nitrogen. The main gland plate 25 has a supply port 48 associated therewith for communication with the barrier chamber 47, which supply port in turn connects to a suitable exterior system (not shown) for supplying pressurized gas to the barrier chamber. The arrangement for supplying a pressurized barrier gas to the barrier chamber is conventional, and further description thereof is believed unnecessary.

As illustrated by FIG. 2, the barrier chamber 47 is sufficiently axially elongated so as to extend axially over the seal rings 31 and 33, whereby the barrier chamber thus communicates with the radially outer ends of the seal interfaces defined between the opposed seal faces 34–35 and 41–42. The barrier gas supplied to the barrier chamber 47 thus continuously communicates with the outer ends of the grooves 36 and 43 to permit creation of a gas seal between the opposed seal faces in a conventional manner.

To nonrotatably secure the seal ring or rotor 32 with respect to the shaft 11, the seal ring 32 has an axially extending slot 53 formed in the inner diameter thereof, and this slot accommodates therein a key 51 which is secured to an elongate shaft sleeve 52, the latter in turn being disposed in surrounding relationship to and nonrotatably secured to the shaft 11, such as by a set screw. An O-ring 55 is captivated within a groove formed in the shaft sleeve 52 to create a seal relationship between the shaft sleeve 52 and the shaft 11.

The rotor 32, intermediate the axial ends thereof, and adjacent the outer axial side (the right side in FIG. 2), has a radially inner stepped configuration defined by a annular wall or shoulder 57 which projects radially outwardly from the inner diameter 58 and which in turn joins to an axially extending inner annular wall 59, the latter projecting axially for intersection with the end face 42. The recess or step defined by the walls 57 and 59 accommodates therein a radially raised annular hub 60 as defined on the shaft sleeve 52. This hub 60 defines thereon an inner annular end face 60A which directly axially opposes and abuts the shoulder 57 so as to securely axially position the rotor 32 to prevent axial outward movement thereof. This hub 60 also has an annular surrounding groove which opens radially outwardly and contains therein an elastomeric seal ring (i.e. an O-ring) 56, the latter maintaining a sealing engagement with the annular inner wall 59 of the rotor.

In a preferred embodiment, the diameter of the inner rotor wall 59 substantially corresponds to the diameter of the inner annular wall end 39 of the inner stator 31, particularly the inner diameter of the seal face 34 formed thereon. This ensures that the pressure imposed on the rotor 32 by contact with the process fluid, which pressure is imposed on one axial side of the rotor 32 from a point located radially inwardly of the annular wall 39, and is imposed on the opposite axial side of the rotor from a location disposed radially inwardly from the annular wall 59, thus effectively balance or cancel one another so as to prevent imposition of undesired unbalanced axial forces on the rotor 32 due to the process fluid.

The stators 31 and 33 respectively have outer annular walls 61 and 62 which are slidably supported on the stepped inner annular wall 46 of the main gland plate 25.

The inner gland plate 26 includes thereon an annular flange 66 which projects axially and concentrically into the interior chamber of the main gland plate 25, and this annular flange 66 has a surrounding annular groove in which there is confined an elastomeric seal ring (i.e., an O-ring) 67 which is maintained in sealing engagement with the inner annular wall 46 of the annular gland plate 25.

Each of the stators 31 and 33 is nonrotatably secured but axially movable relative to the surrounding gland plate 25. For this purpose each stator 31 and 33 has a key or pin 68 fixed thereto and, in the illustrated embodiment, projecting radially outwardly thereof into an axially elongate slot 69 defined in the inner wall of the gland plate 25 so as to permit the stators to move axially relative to the gland plate.

The gland structure 24 also includes a backing member formed as an axially slidable annular pressure piston or pusher 29. In the illustrated embodiment of FIG. 2, this pusher 29 is of a generally Z-shaped configuration when viewed in axial cross section, and includes a radially outer annular wall 72 which is concentrically and axially slidably supported on a radially inner annular wall 71 defined on the annular flange 66. The annular wall 72 has an annular groove formed therein for captivating an elastomeric seal ring (i.e. an O-ring) 73, the latter being maintained in sliding but sealing engagement with the opposed annular wall 71. The pusher 29 also has a generally radially extending rear wall 74 which is disposed in opposed relation to a front wall 75 formed on the intermediate gland plate 26. Under normal seal conditions, this rear wall 74 abuts the front wall 75 as shown in FIG. 2. This rear wall 74 also projects downwardly beyond the lower radially inner edge of the intermediate gland plate 26, and the pusher 29 includes a radially inner annular part 76 which projects radially inwardly and axially under the radially inner edge of the intermediate gland plate 26 so as to terminate at an inner annular wall 78 which is spaced radially outwardly from the shaft sleeve. This thus enables the stuffing box chamber 15 and the process fluid contained therein to freely communicate with an annular region 79 which surrounds the shaft sleeve and is defined generally adjacent the radially inward peripheral walls of the stator 31 and rotor 32.

The inboard seal unit 21 also includes an annular bellows unit 82 which is disposed in surrounding relationship to the shaft and which cooperates between the inner stator 31 and the gland structure, specifically the pusher 29, to define a seal therebetween which creates an isolation between the process fluid and the barrier fluid, and which also resiliently urges the first stator 31 axially outwardly (rightwardly in FIG. 2) toward the rotor 32.

The bellows unit 82, the construction of which is explained hereinafter, has one axial end thereof engaged with a rear end face 83 of the inboard stator 31. The other axial end of the bellows unit 82 is engaged against a front end face of the pusher 29, which front face in this embodiment is generally Z-shaped and includes a radially outer annular front face portion 84 and a radially inner front face portion 85 which is displaced axially rearward from the face portion 84 by means of an axially extending annular shoulder 86 therebetween. The bellows unit 82 is disposed so that the axially rearward end thereof sealingly engages the radially inner front face portion 85, with the bellows being positioned closely adjacent the annular shoulder 86 so that the latter acts as a confinement shoulder or ridge for the bellows.

The outboard seal unit 22 similarly includes an annular bellows unit 91 which surrounds the shaft and extends axially between the outboard stator 33 and an annular backing flange 92 which is fixed to the main gland plate 25 and projects radially inwardly at a location spaced axially outwardly from the outboard stator 33 so as to effectively close off and confine the outer end of the seal arrangement. The bellows unit 91 at an axially inner end is engaged with a rear end wall 93 of the outboard stator 33, and at its other axial end is engaged with an inner wall 94 of the gland flange 92. This inner wall 94 is provided with an annular step or shoulder 95 which projects axially inwardly a limited extend at a location closely adjacent but radially outwardly of the bellows unit 91 to thus act as a confinement shoulder or rim for the bellows unit. The bellows unit 91 creates a seal between the barrier fluid in chamber 47 and the surrounding environment 99, and in addition creates a resilient axial biasing force which is imposed on the rear of the outboard stator 33 so as to resiliently urge the stator 33 axially inwardly toward the rotor 32.

The bellows units 82 and 91 are preferably of identical construction, and hence the construction of the unit 82, for example, will now be described.

Referring to FIG. 4, the bellows unit 82 in a preferred embodiment of the invention is formed as a single convolution or annulus defined by two preferably identical bellows plates or leaflets 111 which are each generally of a truncated conical configuration. The two identical plates 111 are reversely axially oriented so that the radially outer edges 112 thereof are axially spaced from one another, and the radially inner edges 113 of the two plates are disposed in axially abutting relation and are suitably welded together around the entire annular periphery thereof to integrally and sealingly join the two plates 111. The two plates 111 themselves are imperforate so as to be capable of creating a seal between regions disposed on opposite sides thereof.

Each plate 111 has, adjacent but spaced slightly radially inwardly from the outer free edge 112 thereof, an annular part 114 which has a smooth curved exterior convex face which projects generally axially in a direction away from the V-shaped interior region 115 as defined between the two joined plates 111. The region 115 opens radially outwardly for communication with the barrier fluid when installed in the seal arrangement. The annular convex faces 114 function as sealing areas for creating sealing contact with the opposed faces defined on the stator 31 and pusher 29.

Each plate 111 of the single-convolution bellows 82 can, as shown in FIG. 4, be of a multi-ply construction formed by overlying and laminating together one or more individually shaped metal plys or plates 116, the latter being very thin and hence readily formable, with the number of plys which are laminated or stacked being selected so as to provide the desired degree of axial resiliency or spring effect. The plate 111 shown in FIG. 4 is formed by two plys 116.

The construction of the bellows 82 provides the overall bellows with an axial length which is significantly smaller than its radial dimension, as measured between the radially outer and inner diameters 112 and 113, thus providing a very small and compact structure.

When the bellows 82 is positioned for cooperation within the inboard seal substantially as illustrated by FIG. 2, the bellows is disposed so as to freely cooperate between the opposed and substantially parallel end faces formed on the stator 31 and pusher 29, whereby the annular exterior convex faces 114 are thus spring urged against and hence create a snug sealing engagement with the opposed faces 83 and 85 defined on the stator 31 and pusher 29, respectively. The bellows 82 is also disposed so that the one plate 111 has the radially outer edge 112 thereof positioned just radially inwardly of and hence substantially directly under the shoulder 86, which thus effectively centers and maintains the bellows in a proper centered relationship relative to the overall seal unit. The bellows is otherwise, however, mounted substantially independently of the other seal components, and in this manner the bellows is free of any end flanges or collars whereby the construction of the bellows is greatly simplified, and likewise the bellows is free of any permanent or fixed securement to either the stator 31 or the pusher 29.

In addition, because the inner annular region adjacent the bellows is exposed to the process fluid pressure, whereas the V-shaped interior region 115 of the bellows is exposed to the barrier pressure, the balance diameter of the seal (sometimes referred to as the mean effective diameter) with respect to the imposition of barrier and process fluid pressures on the stator 31 is thus defined approximately radially midway between the radially outer and inner diameters of the bellows, which balance diameter for the bellows can be accurately defined and, when so defined, can be maintained with a high degree of precision in view of the manner in which the bellows is formed and confined within the inboard seal unit 21.

In addition, the bellows 82 is positioned such that the sealing or contact point between the bellows 82 and the stator 31, which sealing or contact point is indicated generally by the line 117 in FIG. 4 and extends generally through the center of the exterior convex face 114, is positioned so as to be disposed either at or radially inwardly of the centroid C of the stator 31 so as to maintain proper convergence of the seal faces 34–35 toward the seal dam 37 therebetween.

If necessary so as to improve the sealing characteristics at the seal contact points 117 between the bellows and the opposed faces of the rotor and pusher, an appropriate sealing or gasketing material (i.e., a relatively stiff elastomeric material) having at least limited resiliency can be interposed between the metal plate 111 of the bellows 82 and the opposed hard face of the stator 31 or pusher 29. In a preferred variation for providing this additional sealing characteristic, the bellows can be provided with a thin layer of sealing or gasket material bonded to the exterior surface thereof, such as a thin layer of Teflon or similar material (not shown) bonded at least to the exterior convex faces 114.

Alternatively, other forms of gasketing at the seal contact areas with the bellows are also possible, and such additional variations are illustrated by FIGS. 7–11.

Figure 7:
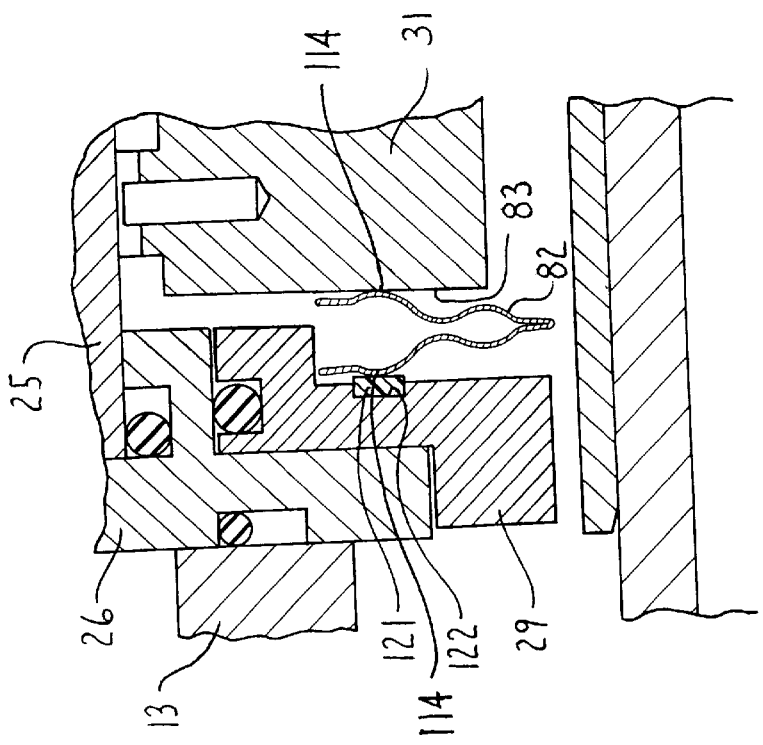
FIG. 7 is a fragmentary sectional view showing a first variation for creating a sealed engagement with an end of the bellows.

For example, in FIG. 7 there is illustrated the use of an annular gasket or seal ring 121 which is disposed within a shallow annular groove 122 formed in the face of the pusher 29. The gasket 121 is disposed so as to be engaged by the exterior convex contact face 114 of the adjacent plate of the bellows 82. As to the opposite bellows plate and its contact with the face 83 of the stator 31, because the stator 31 is typically constructed of a hard and brittle material (i.e. carbon or carbide) whereby forming of grooves and the like therein is difficult, the stator 31 in this variation is provided with the rear face 83 thereof formed with a lapped finish so that the face is thus extremely smooth and is capable of creating a desirable sealing contact with the bellows without interposing an elastomeric gasket therebetween. If necessary or desirable, however, the seal contact area between the bellows 82 and the rear face 83 of the stator 31 can also be provided with a gasket therebetween, such as illustrated by the gasket 123 in FIG. 8. Rather than recessing the gasket 123 into the face of the stator, it is possible to bond the gasket directly onto the face 83 so as to protrude outwardly therefrom, although such is a less desirable construction.

Figure 10:
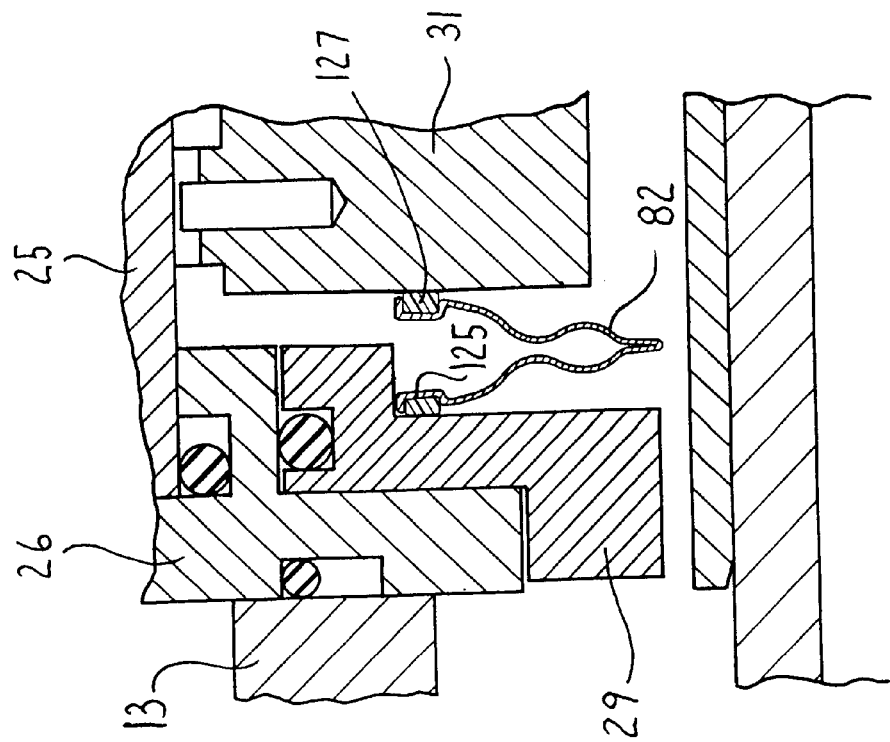
FIG. 10 is a view similar to FIG. 9 but illustrating still a further variation.
Figure 9:
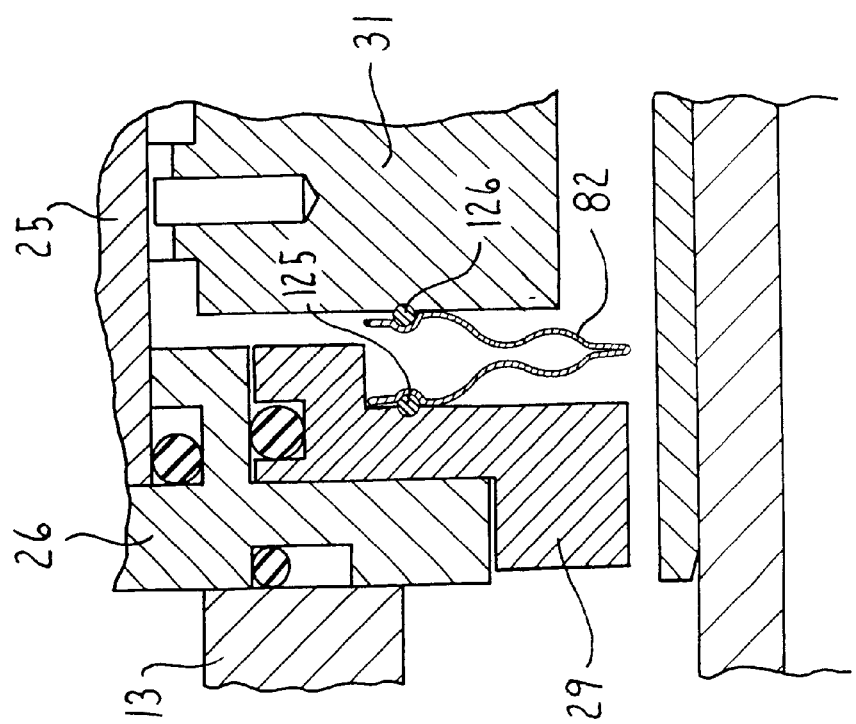
FIG. 9 is a view similar to FIG. 7 but illustrating a third variation wherein the gasket is captivated on the bellows.

As illustrated by FIG. 9, the bellows 82 can be provided with an alternative construction in that, instead of defining an exterior convex face adjacent the radially outer end, the bellows instead can be provided with an annular concave groove 125 which is spaced slightly inwardly from the radially outer edge of the bellow plate, and this groove 125 can be utilized to confine therein an annular elastomeric gasket or seal ring, such as either an O-ring 126 as shown in FIG. 9 or a ring of generally rectangular cross section as shown at 127 in FIG. 10. The groove 125 and the captivation of the seal ring 126 or 127 therein thus positively captivates the seal ring against radial pressures which may tend to squeeze it out, and enables the seal ring to be effectively carried on the bellows so that the seal ring is urged by the bellows into sealing contact with the opposed hard end face on either the stator 31 or the pusher 29.

Figure 11:
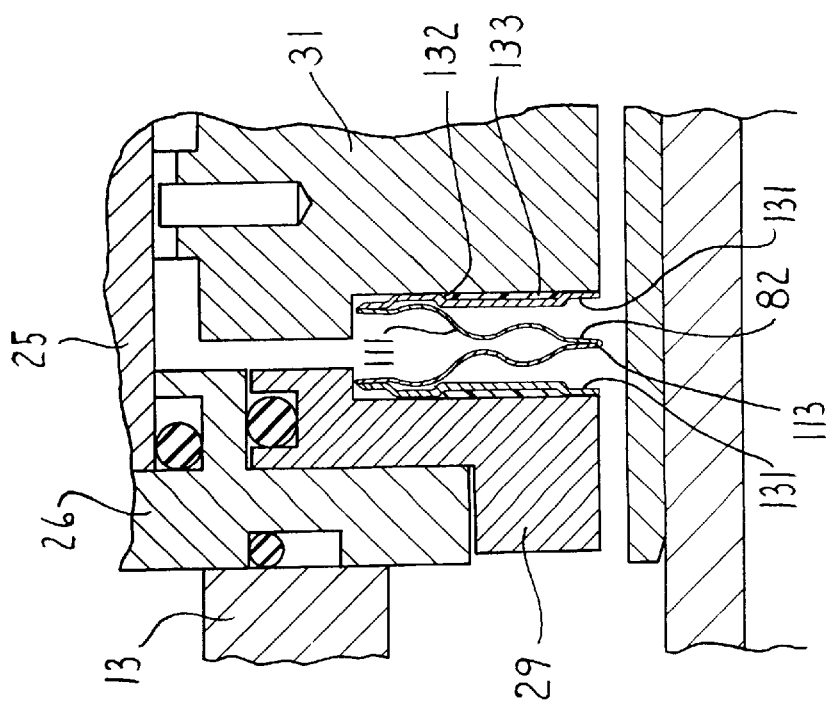
FIG. 11 is a view similar to FIG. 7 but illustrating another variation wherein the bellows is provided with an end plate fixed thereon for confining a gasket.

A still further alternative for sealing the bellows is illustrated in FIG. 11 which shows the single-convolution bellows being formed with annular end plates 131 which at a radially outer edge are fixedly secured, as by welding, to the radial outer edge of the respectively adjacent bellows plate 111. This end ring 131 projects radially inwardly through a significant extent, but typically no greater than the diameter defined by the radially inner edge 113 of the bellows plate. The end ring 131 intermediate the radial extremities thereof has a channel-like annular groove 132 formed therein and opening axially away from the bellows. This channel-like groove captivates therein an annular seal member, such as a ringlike flat gasket 133, which gasket is held against the opposed face of either the stator 31 or pusher 29. With this arrangement, when the bellows is axially compressed so as to be inserted between the pusher and stator substantially as illustrated, the exterior convex annular face 114 on the adjacent bellows plate 111 is positioned to contact the rear or inner surface of the adjacent end ring 131 adjacent the gasket 133 so as to assist in urging the gasket into sealing contact with the opposed face of the stator 31 or pusher 29.

Figure 3:
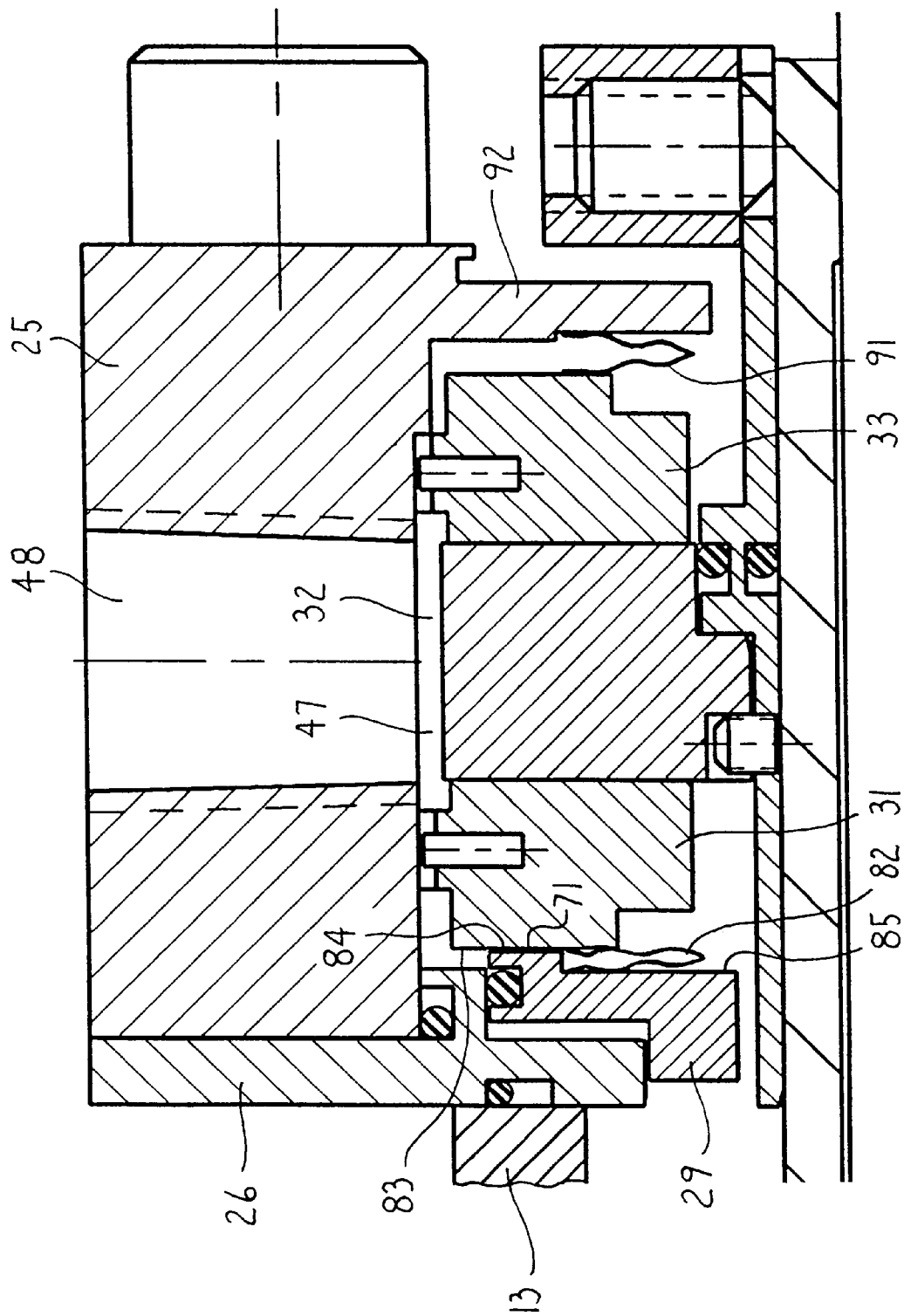
FIG. 3 is a view similar to FIG. 2 but showing the position of the seal when a pressure reversal occurs, that is, in the absence of the barrier fluid pressure.

In the construction of the preferred embodiment of the seal arrangement as illustrated by FIGS. 2 and 3, and particularly when the seal is in the normal operating condition of FIG. 2 wherein the pusher 29 abuts against the inner gland plate 26, the stator 31 and pusher 29 have opposed and axially aligned end faces 83 and 84 which are axially spaced by a relatively small distance. This axial spacing between the opposed and aligned annular end faces 83 and 84 represents the minimal axial spacing between the stator 31 and pusher 29 when in this normal seal condition, and this axial spacing is also significantly less than the axial extent of the bellows 82 which extends between the opposed end faces 83 and 85. Accordingly, in the event of a loss of barrier fluid pressure in the chamber 47, then the pressure of the process fluid acting on the rear faces of the pusher 29 slides the pusher 29 axially outwardly into contact with the stator 31 as illustrated in FIG. 3, whereupon the annular end face 84 on the pusher engages the end face 83 of the stator to create an annular contact zone which effectively functions as a seal to prevent or at least significantly minimize the escape of process fluid. This contact seal between the faces 83 and 84 as shown in FIG. 3 is, in this preferred embodiment, positioned outwardly of the bellows 82. Further, since the normal spacing between these faces 83 and 84 as shown in FIG. 2 is less than the spacing between the bellows contact faces 83 and 85, this thus prevents total compression or collapse of the bellows 82 when the seal moves into the position of FIG. 3.

Figure 5:
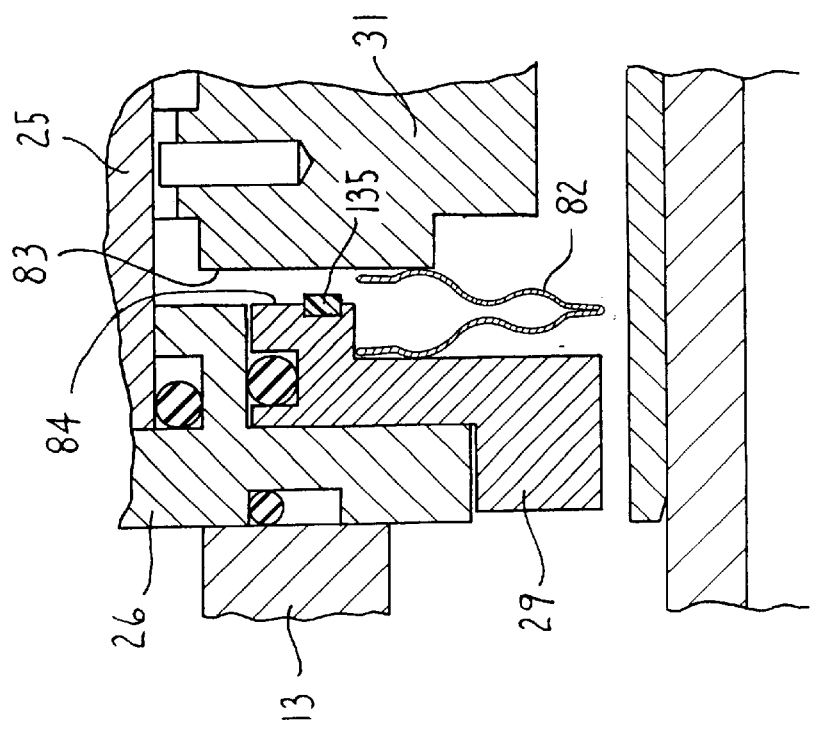
FIG. 5 is a fragmentary sectional view showing a part of FIG. 2 and illustrating a variation thereof.
Figure 8:
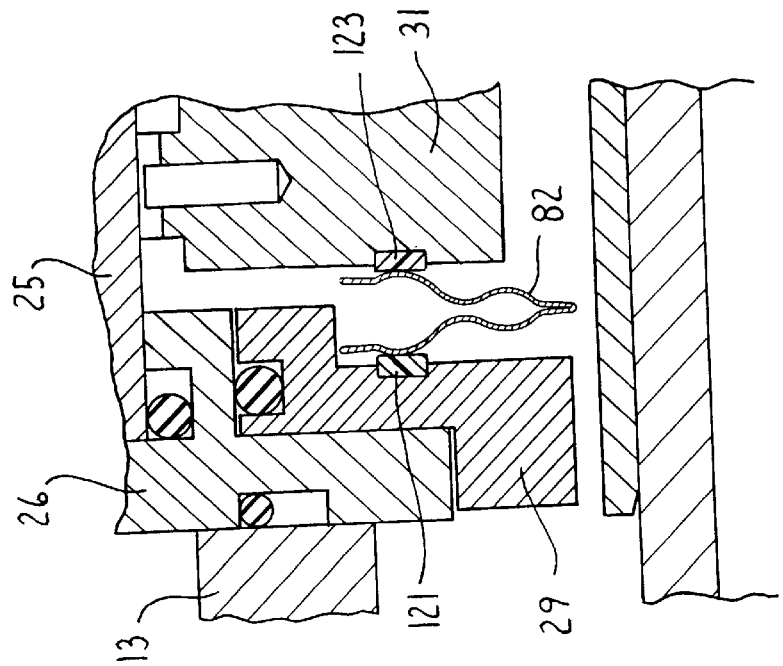
FIG. 8 is a view like FIG. 7 but illustrating a second variation.

If necessary or desired, one of the faces 83 or 84, preferably the face 84 of the pusher 29, can be provided with an annular gasket 135 (FIG. 5) seated in a recess thereon so as to improve the quality of the seal created between the faces 83 and 84 in the event of a loss of barrier fluid pressure.

Figure 6:
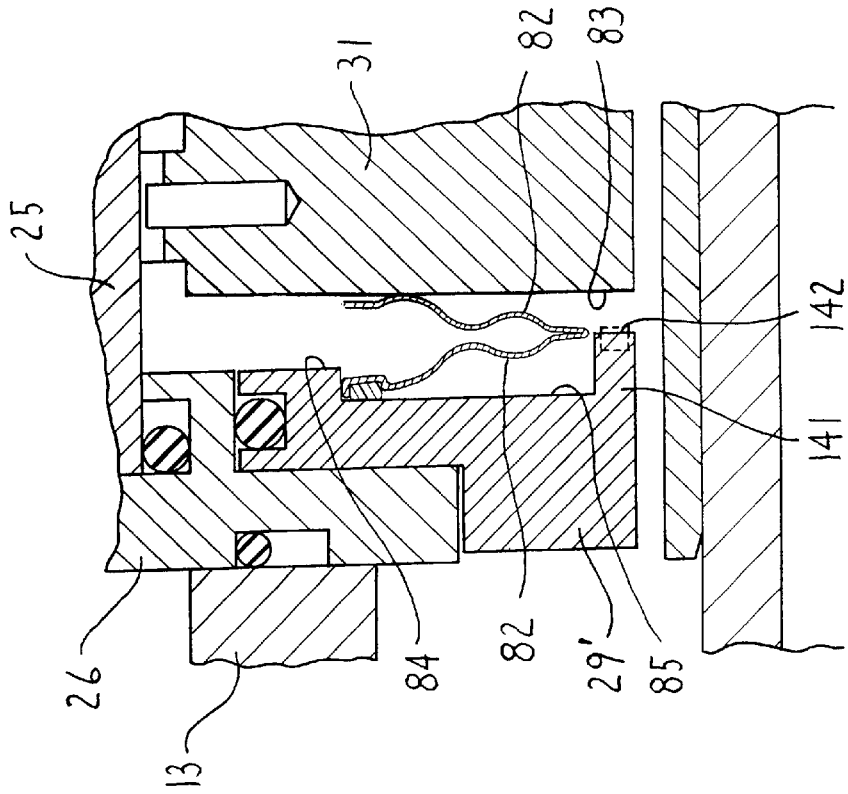
FIG. 6 is a sectional view similar to FIG. 2 and illustrating a modified embodiment for creating a sealed relation between the inboard seal ring and the pusher in an event of a barrier fluid pressure failure.

While the embodiment of the double seal arrangement 10 as illustrated in FIGS. 2–3 provides for sealing contact between the pusher 29 and stator 31 at a location positioned radially outwardly of the bellows 82 upon failure of barrier fluid pressure, the present invention also can achieve a sealing contact between the pusher and stator at a location inwardly of the bellows substantially as illustrated by the variation of FIG. 6.

More specifically, as indicated in FIG. 6, the modified pusher 29' has, adjacent the radially inner diameter thereof and positioned radially inwardly of the bellows 82, an annular flange 141 which projects axially outwardly beyond the faces 84 and 85 whereby this flange 141 is positioned substantially directly radially inwardly from the bellows 82. This flange 141 terminates in an annular free end surface 142 which is typically disposed in opposed but axially spaced relation from the end face 83 of the stator 31. The spacing between these latter faces is the minimal axial spacing between the pusher and stator when in the normal operation position shown by FIG. 6. Upon failure of barrier fluid pressure, the pressure of the process fluid acting on the pusher 29' causes the pusher to be slidably moved axially toward the stator until the end surface 142 is urged into sealing contact with the opposed face 83 of the stator, thereby effectively closing off the process fluid region so as to isolate it from the barrier chamber region. If necessary or desired, the end surface 142 can be provided with an annular gasket or seal therein, as indicated by dotted lines in FIG. 6, or alternatively such gasket or seal can be provided on the opposed annular region of the end face on the stator, to improve the sealing engagement therebetween upon loss of barrier fluid pressure.

The arrangement indicated by FIG. 6 is such that the annular flange 141 and its contact with the stator 31 is substantially coaxially aligned with the dam 37 defined between the seal faces 34 and 35, and thus the closing pressure between the pusher and stator is transmitted axially directly through the stator onto the dam 37, thereby facilitating the creation of good sealing contact between the opposed seal faces 34 and 35 directly at the dam 37 to thus prevent leakage of process fluid outwardly past the seal faces until such time as the malfunction or repair of the barrier fluid system is accomplished and the barrier fluid pressure is again restored.

OPERATION

The operation of the improved mechanical seal arrangement 10 of this invention, particularly with respect to the embodiment as illustrated by FIGS. 2 and 3, will now be briefly described.

Under normal seal operation, the seal arrangement 10 will be disposed substantially as illustrated in FIG. 2. A barrier fluid such as an inert gas will be supplied to the barrier fluid chamber 47 and hence will flow past the exteriors of the stators 31 and 33 so that the barrier fluid accesses the V-shaped interiors of the bellows 82 and 91 and also accesses the grooves 36 and 43 formed in the seal faces defined on opposite ends of the rotor 32. In addition, the process fluid of the pump will normally be present in the stuffing box chamber 15 as well as within the interior annular region 79 defined within the inboard seal unit 21, which process fluid is prevented from escaping due to the seal rings 56 and 73, the bellows 82, and the direct contact between the opposed seal faces 34 and 35, particularly contact at the seal dam 37 when the shaft 11 is stationary or is rotating only at low speed. The pressure of the inert gas supplied to the barrier chamber 47 will typically be higher than the pressure of the process fluid, normally in the range of at least 25 to 50 psi higher. As an example, since the process fluid in small bore pumps typically does not exceed 300 psi, the pressure of the barrier gas may be as high as 350 psi so that the barrier gas pressure will always be higher than the process fluid pressure.

When the pump is in operation and the speed reaches higher rotational limits, the barrier gas is pumped by the rotation of the rotor 32 into the face grooves 36 and 43 to create a hydrodynamic pressure which effectively acts between the opposed seal faces and effects a slight separation between the opposed seal faces, which separation is permitted due to axial movement of the stators 31 and 33 against the urging of the respective bellows 82 and 91. The inert gas thus effectively creates a seal between the opposed seal faces, such as 34–35, the latter now typically being maintained out of contact with one another, and the higher pressure of the barrier gas is such that if any leakage of fluid occurs radially across the opposed seal faces 34–35, then such leakage is in the form of inert gas in small quantities leaking radially inwardly into the process fluid, whereby leakage of process fluid to the surrounding environment can be effectively prevented. The operation of the gas seal as created between the opposed seal faces is conventional and well known, and further description thereof is believed unnecessary.

During operation of the pump, the bellows 82 is not subject to rotation since it is engaged axially between the nonrotatable pusher 29 and stator 31, and hence is subject only to limited axial compression due to axial movement of the stator 31 caused by the lift-off thereof from the rotor 32 as explained above. The bellows 82 always exerts an axial biasing force urging the stator 31 toward the rotor 32, and the seal contact areas on the cantilevered plates of the bellows, namely the convex areas 114 in the arrangement of FIG. 4, thus maintain annular sealing contacts with the opposed end faces defined on the stator 31 and pusher 29. At the same time the bellows is effectively positionally confined by the surrounding annular shoulder 86, but yet the bellows is otherwise free of any fixed or permanently secured contact with at least the stator 31. This thus enables the pressure balance diameter between the barrier and process fluids, which diameter is defined radially between the outer and inner perimeters of the bellows, to be not only originally accurately calculated but also accurately maintained in operation, whereby the application of forces to the stator 31 by the barrier and process fluids can be desirably balanced in a manner well known in the seal art so as to maintain only the desired pressures thereon so as to not disrupt the desired cooperation between the opposed seal faces 34 and 35. More specifically, the actual thrust load on the rotor due to the process fluid is caused by the pressure balance diameter of the bellows 82 relative to the O-ring seal diameter 59, the latter preferably being only slightly smaller than the pressure balance diameter.

If during operation the supply of barrier gas to the chamber 47 is interrupted so that the pressure in the barrier chamber 47 decreased below process fluid pressure, then the process fluid pressure acting against the rear faces of the pusher 29 will slidably move the pusher axially outwardly into the position illustrated by FIG. 3 so that the face 84 on the pusher directly sealing contacts the opposed rear face 83 of the stator 31 to create a seal therebetween which prevents escape of process fluid outwardly between these members, and which also applies a force urging the stator 31 toward the rotor 32 to also effectively maintain a seal therebetween to prevent escape of process fluid.

With the arrangement illustrated by FIG. 2, particularly by providing the radially inner periphery of the seal dam 37 substantially equal to the diameter of the seal contact between the O-ring 56 and the peripheral wall 59 of the rotor, further ensures that the process fluid exerts substantially equal pressure forces both axially outwardly on inner end surfaces of the rotor, and axially inwardly on outer end surfaces of the rotor, thereby minimizing the imposition of unbalanced forces on the rotor 32 so as to prevent undesired stress or distortion thereof.

It will be appreciated that the configuration of the face grooves 36 and 43 as provided on the rotor 32 can assume many variations, and in fact can be of different configurations if desired, depending upon the properties of the gas seal desired. Further, the grooves can be provided on the stators, rather than the rotor, if desired since such is also a known practice.

While the invention as illustrated by the drawings depicts a double seal wherein a common rotor is utilized having the seal faces defined on opposite axial sides thereof, it will be appreciated that the single two-sided rotor 32 can be replaced by two individual rotors, each having a single seal face thereon for cooperation with its respective stator. The use of a single shared rotor, as in the illustrated embodiment, is preferred however so as to enable the overall seal arrangement to have the extremely compact size and configuration which is highly desirable to permit it adaption in small spaces, such as adjacent the stuffing box of a small bore pump.

Merely as illustrative, and not limiting, it should be noted that the desirable common-rotor seal arrangement illustrated by FIGS. 1 and 2 will preferably have an overall axial length of less than about 2½ inches, and the radial dimension of the seal (i.e., maximum seal radius minus shaft radius) will normally be no greater than about 1½ inches.

By use of a simple and compact bellows for creating a secondary seal with the stator, which bellows also functions as a spring to provide the necessary axial resilient bias, not only is the overall construction simplified, but the problems of seal hang-up, temperature breakdown, and chemical incompatibility such as are commonly experienced when using O-rings as secondary seals are hence effectively eliminated or at least greatly minimized. At the same time, many of the undesirable problems caused by the use of prior bellows, namely the use of axially long multi-convolution bellows, including the inability of such long multi-convolution bellows to maintain an accurate pressure diameter, and the complex end flanges and the stresses and distortions caused by mounting of the bellows, are also effectively eliminated by the extremely compact and simplified arrangement illustrated and described herein.

Figure 12:
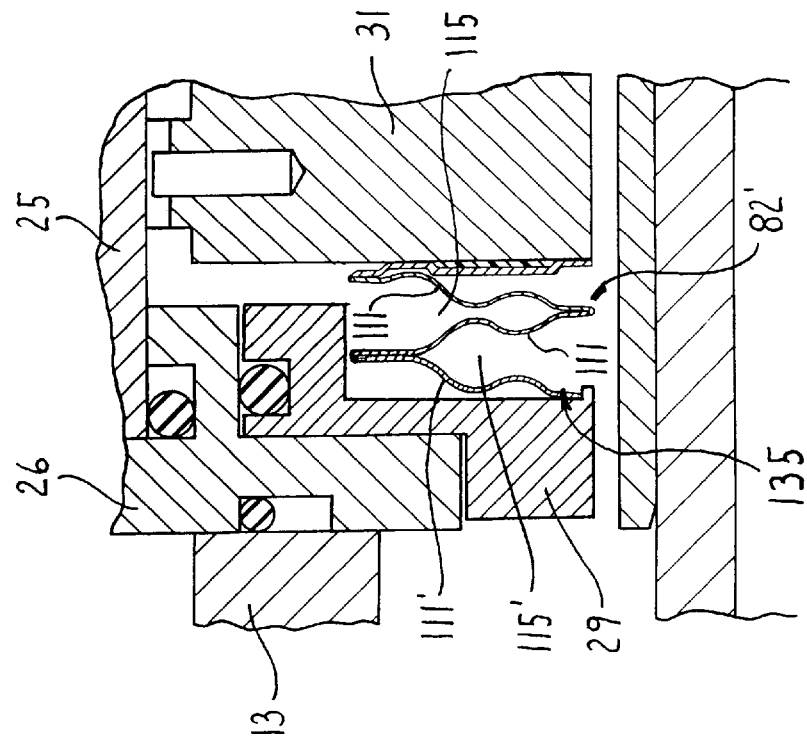
FIG. 12 illustrates a modified bellows configuration.

While the embodiments described above, and as preferred, illustrate use of a single convolution bellows formed by two preferably identical bellows plates welded together, it will be appreciated that in some instances it may be desired to form the bellows by more than a single convolution. In such situation, the bellows typically will not comprise more than 1½ convolutions, being formed by three preferably identical bellows plates as illustrated by FIG. 12. For example, this modified bellows 82' of FIG. 12 includes a first convolution formed by the pair of bellows plates 111 as previously described, and includes the use of a third bellows plate 111' which has the radially outer edge thereof fixedly and sealingly connected to the radially outer edge of one of the adjacent bellows plate 111. This additional bellows plate 111' has the radially inner edge thereof used to create an annular sealing engagement with the adjacent seal component, such as the pusher 29. With this variation, namely a bellows of 1½ convolutions, the bellows again includes one interior V-shaped region 115 which opens radially outwardly for communication with the barrier fluid, and also includes one interior V-shaped region 115' which opens radially inwardly for communication with the process fluid. The sealing contact points between the bellows and the opposed end faces on the stator and rotor can, of course, be constructed in accordance with any of the arrangements which have been illustrated and described herein.

As an alternate construction, the radially inner annular end of plate 111' can be secured to the pusher 29 by an annular weld, as indicated at 135, to create both a seal and a fixed securement of the bellows to the pusher.

The seal arrangement of FIG. 2 can also use an annular weld between the pusher and the radially outer annular end portion of the adjacent bellow plate to create a seal therebetween.

The modified bellows 82 of FIG. 12 will typically be used in those instances where it is desirable to have one end of the bellows make sealing contact at its radially outer diameter, and at the same time have the opposite axial ends of the bellows make sealing contact at its radially inner diameter. The use of three bellows plates will thus accomplishing this purpose without seriously detracting from the overall desirable structural and operational features achieved by the present invention.

It should be noted, by observation of the seal arrangement as illustrated in FIG. 2, that the overall seal arrangement including the gland structure and the inboard and outboard seal units positioned therein, can be effectively constructed and assembled as a cartridge-type seal inasmuch as the seal arrangement is preferably additionally provided with its own shaft sleeve which assists in retaining the assembled construction of the seal arrangement, thereby facilitating installation and adaptation of the cartridge seal onto an existing pump of small seal chamber.

While the invention described above relates primarily to a noncontacting gas seal, it-will be understood that the invention is also equally applicable to contacting-gas seals, and in fact can also be used in contacting-face seals where the barrier fluid is a liquid rather than a gas.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a double gas seal arrangement for creating a sealing relationship between a shaft rotatable about an axis and a stuffing box housing which substantially concentrically surrounds the shaft and is part of a process fluid handling device, said seal arrangement including a gland structure fixed to said housing in surrounding relationship to said shaft, inboard and outboard seal units disposed within said gland structure in surrounding relation to said shaft and in axially adjacent relationship to one another, said inboard seal unit including rotor means nonrotatably coupled to the shaft and a first stator nonrotatably coupled relative to the gland structure and defining a first pair of axially opposed seal faces, and said outboard seal unit including rotor means nonrotatably coupled to the shaft and a second stator nonrotatably coupled to the gland structure and defining thereon a second pair of axially opposed seal faces, an annular chamber for a pressurized barrier fluid defined within said gland structure in surrounding relationship to said seal units, and an annular bellows positioned to extend axially between said first stator and a backing part of said gland structure for creating a sealed engagement therewith and for resiliently urging the first stator axially toward its respective rotor means, said bellows separating said barrier fluid chamber from the process fluid, comprising the improvement wherein said bellows is defined by a single convolution which in turn is defined by two truncated conical bellows plates which have radially inner annular edges thereof disposed in fixed and sealing engagement around the annular peripheries thereof, said bellows plates having radially outer annular edges which are effectively free and are disposed in axially spaced relation from one another to define a generally V-shaped region between the bellows plates which opens radially outwardly for communication with the barrier fluid, each said bellows plate defining thereon an annular sealing area which is disposed adjacent the radially outer edge thereof and creates an annular sealing contact region with an opposed end face defined on a respective one of the first stator and backing part, said bellows being free of fixed or permanent securement to said first stator and said backing part.

2. A seal arrangement according to claim 1, wherein the annular sealing area between the bellows plate and the first stator is defined by a flat lapped surface on the stator and by an annular area on the bellows plate which has a smoothly and exteriorly convexly curved surface when viewed in axial cross section, said flat lapped surface and said curved surface being in direct sealing engagement with one another.

3. A seal arrangement according to claim 1, wherein one of the annular sealing areas as defined between the bellows and one of the first stator and backing part includes an annular gasket member interposed between the bellows plate and the respective one of the opposed first stator and backing part.

4. A seal arrangement according to claim 1, wherein each of the annular sealing areas as defined between the two bellows plates and the first stator and backing part includes an annular gasket member interposed therebetween.

5. A seal arrangement according to claim 1, wherein at least one of the plates of the bellows adjacent the radially outer edge thereof is provided with an axially depressed annular groove which captivates therein an annular gasket member so that the latter is radially restrained relative to the bellows plates and is disposed so as to axially face toward and sealingly contact an opposed end face on the respective first stator and backing part.

6. A seal arrangement according to claim 1, wherein the backing part on the opposed end face thereof includes an annular shoulder which projects axially toward the first stator and faces radially inwardly, and said bellows being positioned radially inwardly with respect to said annular shoulder so that the radially outer edge of the bellows plate which contacts said backing part is disposed closely adjacent and radially surrounded by said annular shoulder.

7. A seal arrangement according to claim 1, wherein said gland structure includes a second backing part which projects radially inwardly toward the shaft and is positioned adjacent but disposed axially outwardly from said second stator, and a second bellows positioned axially between said second backing part and an outer end face of said second stator for creating a sealed engagement therebetween and for resiliently urging said second stator axially toward its respective rotor means, said second bellows being substantially identical to said first-mentioned bellows, said second bellows creating a seal between said barrier fluid and the surrounding environment.

8. A seal arrangement according to claim 7, wherein the rotor means of the first seal unit and the rotor means of the second seal unit are defined by a common rotor member which is nonrotatably secured to the shaft and is positioned axially between said first and second stators.

9. A seal arrangement according to claim 1, wherein said backing part comprises an annular pusher member which is sealingly but axially slidably supported relative to said gland structure and is positioned generally coaxially aligned with but spaced axially inwardly relative to said first stator with said bellows being axially interposed therebetween, said pusher member having an axially directed rear face which is exposed to said process fluid.

10. A seal arrangement according to claim 9, wherein said pusher member includes an annular nose part which projects axially outwardly toward but is maintained in axially spaced relation from an opposed rear face on said first stator during normal operation of said seal arrangement, said pusher member being axially displaced by the process fluid toward said first stator upon failure of barrier fluid pressure so that the annular nose part moves into abutting sealing contact with the opposed rear face of said first stator to create a secondary seal therebetween.

11. A seal arrangement according to claim 10, wherein said annular nose part is disposed radially outwardly of and at least partially surrounds said bellows.

12. A seal arrangement according to claim 10, wherein said annular nose part is positioned radially inwardly of said bellows.

13. A seal arrangement according to claim 10, wherein the axial spacing between the annular nose part on the pusher member and the opposed end face on the first stator, during normal operation of the seal arrangement, is less than the axial length of the bellows so as to prevent total axial collapse of the bellows when the pusher member is axially displaced so that the annular nose part moves into abutting sealing contact with the opposed rear face of the first stator.

14. A seal arrangement according to claim 1, wherein said annular sealing area between the bellows plate and the first stator is disposed at a diameter which is substantially the same as or smaller than the diameter defined by the centroid of the first stator.

15. A seal arrangement according to claim 1, wherein said bellows, during normal operation of the seal arrangement, has an axial length which is significantly less than the radial width of the bellows as measured between the radially inner and outer annular edges of the bellows plates.

16. In a double seal arrangement for a process fluid handling device having an annular stuffing box housing and a rotatable shaft projecting through and outwardly of the stuffing box housing for rotation about the shaft axis, said seal arrangement including a gland structure fixed to said housing in surrounding relation to said shaft, inboard and outboard seal units disposed within said gland structure and housing in surrounding relation to said shaft and in axially adjacent relationship to one another, said inboard seal unit including rotor means nonrotatably coupled to the shaft and a first stator nonrotatably coupled relative to the gland structure and defining a first pair of axially opposed seal faces, and said outboard seal unit including rotor means nonrotatably coupled to the shaft and a second stator nonrotatably coupled to the gland structure and defining thereon a second pair of axially opposed seal faces, an annular chamber for a barrier fluid defined within the gland structure in surrounding relationship to said seal units, and an annular bellows disposed in surrounding relationship to the shaft and extending axially between said first stator and a backing part which is nonrotatably fixed relative to the gland structure for creating a sealed engagement therebetween and for resiliently urging the first stator axially toward its respective rotor means, said bellows separating said barrier fluid chamber from the process fluid, comprising the improvement wherein the bellows is defined by a plurality of axially adjacent bellows plates, at least some of said bellows plates being of truncated conical configurations, said bellows plates having radially inner and outer annular edges which are substantially respectively coaxially aligned, at least a first pair of adjacent said bellows plates having one of the aligned radially inner and outer edges thereof disposed in abutting and fixed sealed engagement with one another, said bellows having one of said bellows plates positioned adjacent an axial end of the bellows and one of the radially inner and outer annular edges thereof defining a free edge part which creates an annular sealing contact region with an opposed end face defined on said first stator, said bellows being free of fixed or permanent securement to said first stator, and said bellows having an axial length as measured between opposite axial ends thereof which is significantly smaller than the radial dimension of the bellows as defined between the radially inner and outer annular edges of the bellows plates, another one of said bellows plates defining the other axial end of said bellows and one of the radially inner and outer annular edges of said another bellows plates creating an annular sealing contact region with an opposed end face defined on said backing part, said bellows also being free of fixed or permanent securement to said backing part.

17. A seal arrangement according to claim 16, wherein said bellows is defined by no more than three bellows plates which are disposed axially in series and are alternately fixedly secured to an adjacent plate adjacent one of the radially inner and outer annular edges thereof.

18. A seal arrangement according to claim 16, wherein said bellows is defined by only two said bellows plates which cooperate to define a single convolution.

19. A seal arrangement according to claim 16, wherein a seal member is disposed between opposing surfaces of at least one of said sealing contact regions of said bellows and an opposing one of said end faces of said backing part and said stator.

20. A seal arrangement according to claim 19, wherein at least one of said opposing surfaces supports said seal member thereon.

21. A seal arrangement according to claim 20, wherein said one of said opposing surfaces includes a recess in which said seal member is received.

22. In a double seal arrangement for a process fluid handling device having an annular stuffing box housing and a rotatable shaft projecting through and outwardly of the stuffing box housing for rotation about the shaft axis, said seal arrangement including a gland structure fixed to said housing in surrounding relation to said shaft, inboard and outboard seal units disposed within said gland structure and housing in surrounding relation to said shaft and in axially adjacent relationship to one another, said inboard seal unit including rotor means nonrotatably coupled to the shaft and a first stator nonrotatably coupled relative to the gland structure and defining a first pair of axially opposed seal faces, and said outboard seal unit including rotor means nonrotatably coupled to the shaft and a second stator nonrotatably coupled to the gland structure and defining thereon a second pair of axially opposed seal faces, an annular chamber for a barrier fluid defined within the gland structure in surrounding relationship to said seal units, and an annular bellows disposed in surrounding relationship to the shaft and extending axially between said first stator and a backing part which is nonrotatably fixed relative to the gland structure for creating a sealed engagement therebetween and for resiliently urging the first stator axially toward its respective rotor means, said bellows separating said barrier fluid chamber from the process fluid, comprising the improvement wherein the bellows is defined by a plurality of axially adjacent bellows plates, at least some of said bellows plates being of truncated conical configurations, said bellows plates having radially inner and outer annular edges which are substantially respectively coaxially aligned, at least a first pair of adjacent said bellows plates having one of the aligned radially inner and outer edges thereof disposed in abutting and fixed sealed engagement with one another, said bellows having one of said bellows plates positioned adjacent an axial end of the bellows and one of the radially inner and outer annular edges thereof defining a free edge part which creates an annular sealing contact region with an opposed end face defined on said first stator, said bellows being free of fixed or permanent securement to said first stator, and said bellows having an axial length as measured between opposite axial ends thereof which is significantly smaller than the radial dimension of the bellows as defined between the radially inner and outer annular edges of the bellows plates, said backing part being axially slidably supported on the gland structure and being axially acted on by the process fluid and being movable axially toward the first stator, said first stator and said backing part having axially opposed and aligned end surfaces which are normally spaced apart by an axial separation which is less than the normal axial length of the bellows to prevent full collapse of the bellows in the event the process fluid axially displaces the backing part into contact with the first stator.

23. A seal arrangement according to claim 22, wherein said backing part is an annular pusher member, said pusher member having an axially directed rear face which is exposed to said process fluid.

24. A seal arrangement according to claim 22, wherein said backing part includes an annular flange which projects axially outwardly toward but is maintained in axially spaced relation from an opposed rear face on said first stator during normal operation of said seal arrangement, said backing part being axially displaced by the process fluid toward said stator upon a reduction in barrier fluid pressure so that the annular flange moves into abutting sealing contact with the opposed rear face of said first stator to create a seal therebetween.

25. A seal arrangement according to claim 24, wherein said annular flange is disposed radially outwardly of and at least partially surrounds said bellows.

26. A seal arrangement according to claim 24, wherein said annular flange is disposed radially inwardly of said bellows.

27. A seal arrangement according to claim 24, wherein a seal member is disposed axially between said first stator and said backing part and provides a seal therebetween when said backing part is displaced into contact with said first stator.

28. In a double seal arrangement for a process fluid handling device having an annular stuffing box housing which defines a process fluid chamber and a rotatable shaft projecting through and outwardly of the stuffing box housing for rotation about the shaft axis, said seal arrangement including a gland structure fixed to said housing in surrounding relation to said shaft, inboard and outboard seal units disposed within said gland structure and housing in surrounding relation to said shaft and in axially adjacent relationship to one another, said inboard seal unit including rotor means nonrotatably coupled to the shaft and a first stator nonrotatably coupled relative to the gland structure and defining a first pair of axially opposed seal faces, and said outboard seal unit including rotor means nonrotatably coupled to the shaft and a second stator nonrotatably coupled to the gland structure and defining thereon a second pair of axially opposed seal faces, an annular barrier fluid chamber for a barrier fluid defined within the gland structure in surrounding relationship to said seal units, and an annular bellows disposed in surrounding relationship to the shaft and extending axially between said first stator and a backing part which is nonrotatably fixed relative to the gland structure for creating a sealed engagement therebetween and for resiliently urging the first stator axially toward its respective rotor means, said bellows separating said barrier fluid chamber from the process fluid in said process fluid chamber, comprising the improvement wherein the bellows is defined by a plurality of axially adjacent bellows plates, at least some of said bellows plates being of truncated conical configurations, said bellows plates having radially inner and outer annular edges which are substantially respectively coaxially aligned, at least a first pair of adjacent said bellows plates having one of the aligned radially inner and outer edges thereof disposed in abutting and fixed sealed engagement with one another, and said backing part being axially slidably supported on the gland structure and being axially acted on by the process fluid and being movable axially toward the first stator, said first stator and said backing part having axially opposed end surfaces which are normally spaced apart by an axial separation which is less than a normal axial length of the bellows to prevent full collapse of the bellows in the event the process fluid axially displaces the backing part into contact with the first stator, a seal member being disposed between said opposed end surfaces to define a seal between said first stator and said backing part when said backing part is displaced into contact with said first stator by the process fluid.

29. A seal arrangement according to claim 28, wherein one of said opposed end surfaces includes a groove, said seal member being received within said groove.

30. A seal arrangement according to claim 29, wherein said groove includes radially spaced surfaces between which said seal member is received to confine radial movement of said seal member.

31. A seal arrangement according to claim 28, wherein said seal member is disposed either radially outwardly from said bellows to sealingly separate said bellows from said barrier fluid chamber, or radially inwardly from said bellows to sealingly separate said bellows from said process fluid chamber.

* * * * *